R. L. LANDRY.
COMBINED HOSE REEL AND VALVE.
APPLICATION FILED JULY 8, 1913.
1,132,590.
Patented Mar. 23, 1915.
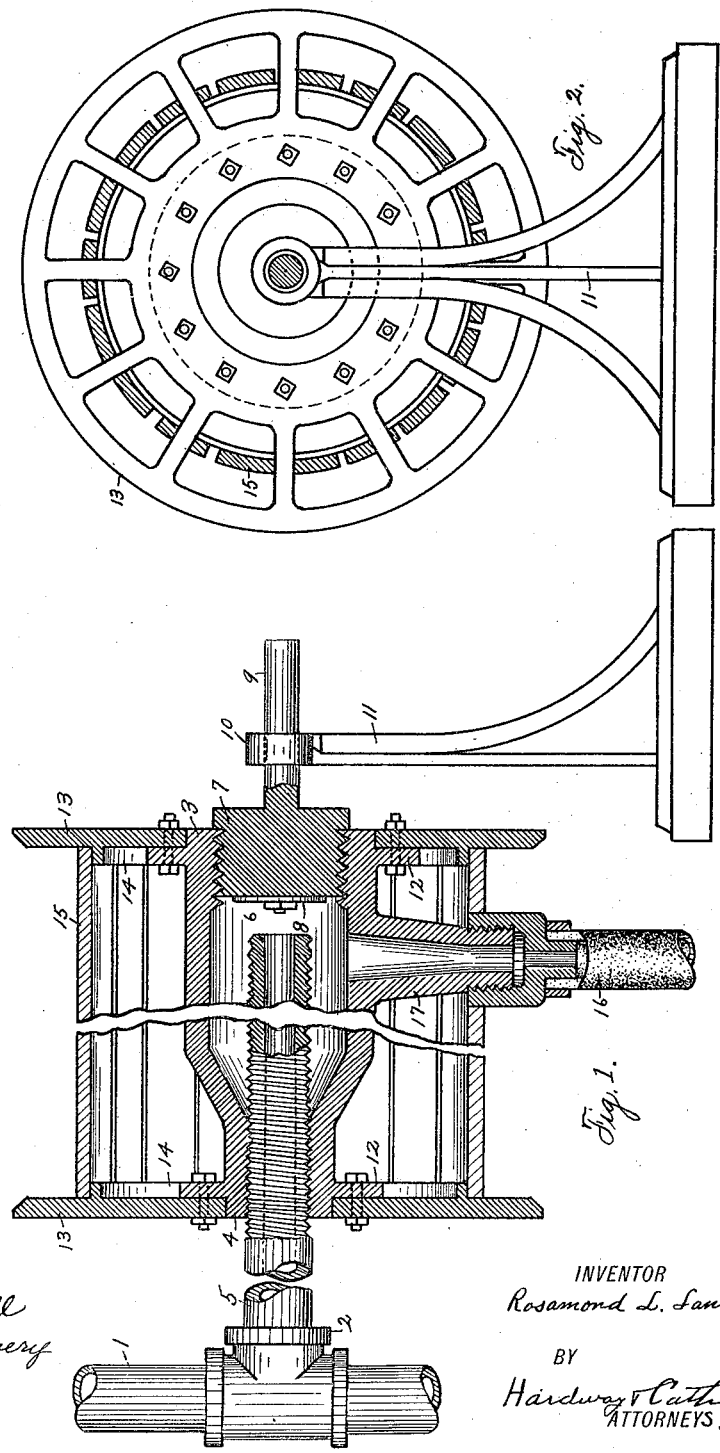

UNITED STATES PATENT OFFICE.

ROSAMOND L. LANDRY, OF HOUSTON HEIGHTS, TEXAS.

COMBINED HOSE-REEL AND VALVE.

1,132,590.          Specification of Letters Patent.      Patented Mar. 23, 1915.

Application filed July 8, 1913. Serial No. 777,836.

*To all whom it may concern:*

Be it known that I, ROSAMOND L. LANDRY, a citizen of the United States, residing at Houston Heights, in the county of Harris and State of Texas, have invented certain new and useful Improvements in Combined Hose-Reels and Valves, of which the following is a specification.

This invention relates to new and useful improvements in a combined hose reel and valve.

The object of the invention is to provide a reel of the character described having a water hose so attached thereto that when the reel is unwound the valve controlling the flow of water from the supply pipe to the hose will be automatically opened thus avoiding the delay which would be incidental to the opening of a valve in case the valve now in common use, which is operated manually, were employed.

A further object of the invention resides in the provision of a reel which is rotatable and around which the hose may be wound when not in use and from which the hose may be readily unwound in case of fire, thus protecting the hose and rendering the same accessible.

With the above and other objects in view, the invention has particular relation to certain novel features of construction and operation, an example of which is given in the specification and illustrated in the accompanying drawings, wherein—

Figure 1 is a sectional side elevation of the complete device and Fig. 2 is an end view thereof.

Referring now more particularly to the drawings wherein like numerals of reference designate similar parts in each of the figures, the numeral 1 refers to a water supply pipe having the ordinary T connection 2.

The numeral 3 designates the hub of the reel which is a hollow tubular member reduced and inwardly threaded at one end, as at 4, and projecting out from the T joint 2 is a water pipe 5 which is outwardly threaded and which is threaded through the reduced portion 4 of the hub 3 and whose inner end projects into the chamber 6 of said hub. The other, or enlarged end of said hub has a plug 7 screwed therein which is alined with the pipe 5. The inner end of this plug has a seat 8 and projecting from the outer end thereof is the shaft 9 which is integral therewith and which is rotatable in the bearing 10 carried by the upper end of the fixed support 11. The shaft 9 is also slidable in the bearing 10. Each end of the hub has an annular flange 12, 12 and to each flange is bolted an annular rim 13, 13, forming the ends of the reel. Each rim has an inwardly projecting annular flange 14, 14 which support lengthwise slats 15, 15 which are secured to said flanges at their ends and are spaced apart so as to form a cylindrical body or drum around which the hose 16 is wound when not in use.

An outlet spout 17 is formed integral with the hub 3 which communicates with the interior chamber 6 thereof and which extends at right angles from said hub through the reel and the hose 16 is screwed upon the outer or free end thereof. In order to wind the hose upon the reel, the reel is turned and as it turns the shaft 9 turns in its bearing 10 and the threaded portion 4 turns upon the outwardly threaded pipe 5, causing the entire reel to move toward the supply pipe 1 and finally seating the free end of the said supply pipe against the seat 8 and thus cutting off the flow of water. In case of fire or when water is desired for any other purpose, the free end of the hose is grasped and pulled, causing the reel to turn, said reel moving on the pipe 5 away from the supply pipe 1. This movement carries the seat 8 away from the free end of the pipe 5 and the water is permitted to flow into the chamber 6 and thence out through the pipe 17 and when the hose is entirely unwound the water will flow therethrough.

This device may be placed on the inside of buildings or in any place where a fire is likely to occur and where it is desired to have water immediately available in case of such fire.

What I claim is:—

1. A device of the character described in combination a reel comprising a drum and a hub hollow from end to end, one end of said hub being reduced and each end inwardly threaded, a flange integral with each end of said hub upon the periphery thereof, said drum being rigidly secured to said flange, a water supply pipe, a hollow shaft communicating therewith and being outwardly threaded and extending through the reduced portion of said hub and forming an adjusable threaded bearing and having its inner end free, an outwardly threaded plug screwed into the other end of said hub and alined with said shaft; a packing member carried by the inner end of said plug, a supporting shaft extending from said hub, a fixed bearing in which said last mentioned shaft is slidably and rotatably mounted and an outlet spout communicating with the interior of the hub and extending out through said reel and having its free end threaded and a flexible hose secured to said free end.

2. A device of the character described consisting of a reel comprising a hub hollow from end to end, one end of said hub being reduced and each end inwardly threaded, a flange upon the periphery of said hub at each end thereof and integral therewith, a drum secured thereto, a water supply pipe, a hollow shaft communicating therewith and being outwardly threaded and extending through the reduced threaded portion of said hub, an adjustable threaded bearing having its inner end free, an outwardly threaded plug screwed into the other end of said hub and alined with said shaft, a packing member carried by the inner end of said plug, a means for holding said packing member in position against said plug, a supporting shaft extending from said hub and integral therewith, a fixed bearing in which said last mentioned shaft is slidably and rotatably mounted and an outlet spout integral with said hub communicating with the exterior of said drum and the interior of said hub and having its free end threaded and a flexible hose secured to said free end.

In testimony whereof I have signed my name to this specification in the presence of two subscribing witnesses.

ROSAMOND L. LANDRY.

Witnesses:
T. A. WORRELL,
J. E. SHANNON.

Copies of this patent may be obtained for five cents each, by addressing the "Commissioner of Patents, Washington, D. C."